United States Patent
Soyama et al.

(10) Patent No.: US 8,400,144 B2
(45) Date of Patent: Mar. 19, 2013

(54) ROTATIONAL POSITION SENSOR HAVING AXIALLY CENTRAL SENSOR UNIT

(75) Inventors: Hiroaki Soyama, Odawara (JP); Yoshinobu Komoto, Odawara (JP)

(73) Assignee: Mikuni Corporation, Tokyo (JP)

( * ) Notice: Subject to any disclaimer, the term of this patent is extended or adjusted under 35 U.S.C. 154(b) by 251 days.

(21) Appl. No.: 12/923,615

(22) Filed: Sep. 29, 2010

(65) Prior Publication Data

US 2011/0018529 A1 Jan. 27, 2011

Related U.S. Application Data

(63) Continuation of application No. PCT/JP2009/052188, filed on Feb. 10, 2009.

(30) Foreign Application Priority Data

Mar. 31, 2008 (JP) .................................. 2008-089905

(51) Int. Cl.
*G01B 7/30* (2006.01)
*G01B 7/14* (2006.01)

(52) U.S. Cl. .............................. 324/207.25; 324/207.11

(58) Field of Classification Search .......................... None
See application file for complete search history.

(56) References Cited

U.S. PATENT DOCUMENTS

| | | | |
|---|---|---|---|
| 6,445,178 B1 * | 9/2002 | Hoekstra ................... | 324/207.12 |
| 6,799,893 B2 * | 10/2004 | Hokkirigawa et al. ....... | 384/271 |
| 6,809,513 B2 * | 10/2004 | Terui et al. ................ | 324/207.25 |
| 6,946,831 B2 * | 9/2005 | Miyata et al. ............. | 324/207.25 |

FOREIGN PATENT DOCUMENTS

| | | |
|---|---|---|
| JP | 1-023114 | 1/1989 |
| JP | 4-115120 | 4/1992 |
| JP | 11-201713 | 7/1999 |
| JP | 2000-107288 | 4/2000 |
| JP | 2001-124508 | 5/2001 |
| JP | 2002-250343 | 9/2002 |
| JP | 2003-269992 | 9/2003 |
| JP | 2004-150905 | 5/2004 |

OTHER PUBLICATIONS

International Search Report for PCT/JP2009/052188, mailed Mar. 10, 2009.

* cited by examiner

*Primary Examiner* — Vinh Nguyen

(57) ABSTRACT

A rotational position sensor includes a rotating body rotatably supported around a predetermined axis line by a bearing portion of a housing and a sensor unit having a movable sensor element arranged at the rotating body to detect a rotational angle position of the rotating body and a fixed sensor element arranged at the housing. The rotating body includes a tapered annular contact face defining a part of a virtual cone face with a vertex on the axis line and the bearing portion includes a tapered annular bearing face rotatably supporting the annular contact face on the virtual cone face. Accordingly, the rotating body is consistently located on the axis line due to an automatic alignment effect. Therefore, the rotational angle position of the rotating body can be detected with high accuracy even with occurrence of aging variation such as wearing at a bearing area.

20 Claims, 12 Drawing Sheets

ROTATIONAL POSITION SENSOR HAVING AXIALLY CENTRAL SENSOR UNIT

CROSS-REFERENCE TO RELATED APPLICATIONS

This application is a continuation, filed under 35 U.S.C. §111(a), of PCT international application No. PCT/JP2009/052188, filed Feb. 10, 2009, which application claims the priority benefit of Japanese patent application No. 2008-089905, filed Mar. 31, 2008, the disclosures of which are incorporated herein by reference.

BACKGROUND

1. Field

Embodiments relate to a rotational position sensor which detects an angle position of a rotating body, and in particular, relates to a contact-type or non-contact type rotational position sensor which detects a rotational angle of a throttle shaft for an engine mounted on a vehicle and the like, a depression angle of an accelerator pedal which is swung around a predetermined axis, and the like.

2. Description of the Related Art

A rotational position sensor known in the related art includes a housing having a bearing hole in the radial direction and a bearing end face in the thrust direction, a rotor having a shaft portion rotatably inserted to the bearing hole of the housing while being contacted to the bearing end face, a return spring which rotationally urges the rotor toward a predetermined rotational angle position, a substrate which is arranged to be opposed to a disk-shaped collar portion formed outside the shaft portion of the rotor in the radial direction within the housing and at which a fixed terminal for detection is formed, a movable contact point arranged at the collar portion of the rotor so as to be contacted to the fixed terminal of the substrate, an arm arranged at the outside of the housing and coupled with the rotor, and the like. With the rotational position sensor, when the rotor is rotated via the arm, the contact position between the movable contact point arranged at the collar portion of the rotor and the terminal arranged on the substrate is varied. The rotation angle position of the rotor (i.e., the arm) is to be detected by detecting current value and the like which vary corresponding to the variation of the angle position. An example of this conventional rotational position sensor may be found in, for example, Japanese Patent Publication 2001-124508.

Another known rotational position sensor includes a housing having a bearing hole in the radial direction, a shaft having a shaft portion rotatably inserted to the bearing hole of the housing, a ring-shaped movable magnet fixed to a disk-shaped collar portion formed outside the shaft portion of the shaft within the housing in the radial direction, a plurality of magnetic plates fixed to the housing so as to sandwich the movable magnet in the direction of the axis line of the shaft, a Hall element arranged between the magnetic plates, and the like. When the shaft is rotated, the relative angle position among the movable magnet (i.e., the north pole and south pole) of the shaft and the magnetic plates and the Hall element fixed to the housing is varied. The rotational angle position of the shaft is to be detected by detecting variation of magnetic fluxes flowing through the Hall element corresponding to the variation of the angle position. An example of this conventional rotational position sensor may be found in, for example, Japanese Patent Publication 2004-150905.

With the above rotational position sensors, the rotor or the shaft portion of the shaft is rotatably supported by the bearing hole of the housing, and then, the movable contact point and fixed terminal or the movable magnet and Hall element etc. for detection are arranged at the outside of the shaft portion in the radial direction. Accordingly, the rotational center of the rotor or the shaft which is to be inherently located at a predetermined position may be varied due to wearing and the like at the outer circumferential face of the shaft portion or the inner circumferential face of the bearing hole. As a result, there is a fear that the relative positional relation between the movable contact point and the fixed terminal or the relative positional relation between the movable magnet and the Hall element is varied and that the rotational position of the rotor or the shaft cannot be detected with high accuracy.

Further, with the rotational position sensors, the movable contact point and fixed terminal or the movable magnet and Hall element etc. for detection are arranged at the outside of the rotor or the shaft portion of the shaft in the radial direction. Accordingly, there has been a problem that an area around the shaft portion cannot be effectively utilized as the arrangement area of the components, which causes an upsizing of the structure.

SUMMARY

To address the above issues, it is one aspect to provide a rotational position sensor capable of detecting a rotational angle position of a rotating body with high accuracy by supporting the rotating body such as a rotor and a shaft of which rotational position is detected so as to obtain an automatic alignment effect even with occurrence of aging variation such as wearing at a bearing area. In addition, with the rotational position sensor, structural simplification, miniaturization and the like can be achieved by effectively utilizing an area on an axis line (i.e., a rotational center line) of the rotating body as a location for component arrangement.

Additional aspects will be set forth in part in the description which follows and, in part, will be apparent from the description, or may be learned by practice of the invention.

According to one aspect, a rotational position sensor to detect the rotational angle of a shaft includes a housing having a bearing portion, a rotating body rotatably supported by the bearing portion around a predetermined axis line, and a sensor unit having a movable sensor element arranged at the rotating body to detect a rotational angle position of the rotating body and a fixed sensor element arranged at the housing. Here, the rotating body includes an annular contact face having the axis line as the center and the bearing portion includes an annular bearing face having the axis line as the center and receiving the annular contact face. Then, at least one of the annular contact face and the annular bearing face is formed to be a tapered annular face which defines a part of a virtual cone face having a vertex on the axis line.

With this configuration, the rotating body and the bearing portion perform rotatable supporting around the predetermined axis line as the annular contact face being contacted to the annular bearing face. Then, at least one of the annular contact face and the annular bearing face is formed to be the tapered annular face which defines a part of the virtual cone face having the vertex on the predetermined axis line. Accordingly, the rotating body is consistently located on the axis line due to the automatic alignment effect. Therefore, even with occurrence of aging variation such as wearing at the bearing area, positional deviation of the movable sensor element of the rotating body and the fixed sensor element of the housing, which constitute the sensor unit, against the axis line can be prevented and the rotational angle position of the rotating body can be detected with high accuracy.

The housing may include a separately-formed guide member and the guide member may include the annular bearing face.

With this configuration, since the annular bearing face is formed by the guide member separately formed from the housing, it is possible to adopt dedicated material having excellent abrasion resistance as being different from the material of the housing. Therefore, total cost can be reduced while maintaining abrasion resistance and the like at the bearing area.

The annular bearing face may be formed to have a section convexly curved toward the annular contact face.

With this configuration, the rotating body can be rotated more smoothly by decreasing slide resistance between the annular contact face and the annular bearing face while maintaining the automatic alignment effect of the rotating body.

The rotating body may include a connection hole to connect the shaft of which rotational angle is to be detected.

With this configuration, it is essentially possible to detect the angle position only by connecting the shaft of which rotational angle position is to be detected to the connection hole of the rotating body. Accordingly, the rotational position sensor can be handled as an independent module component with high flexibility and the rotational position sensor can be adopted to any object which includes a shaft to be detected.

A return spring to return the rotating body toward a predetermined angle position may be arranged at the housing.

With this configuration, since the rotating body is returned to the predetermined angle position (i.e., an initial position) by the return spring, the rotational position sensor can be easily adopted to a case of detecting a rotational angle having the initial position as the reference.

The rotating body may include a cylindrical portion having the axis line as the center and a disk portion which defines the annular contact face as being formed integrally with one end side of the cylindrical portion and that the housing includes a housing main body having the annular bearing face and a housing cover having a cylindrical bearing face to rotatably support the cylindrical portion as being formed detachably attachable to the housing main body.

With this configuration, the rotating body is supported as the annular contact face of the disk portion thereof being rotatably supported by the annular bearing face of the housing main body and as the cylindrical portion thereof being rotatably supported by the cylindrical bearing face of the housing cover in a state that the rotating body is accommodated by the housing main body and the housing cover.

Accordingly, at the time of assembling, the rotating body may be assembled to the housing main body as the annular contact face being contacted to the annular bearing face, and then, the housing cover is coupled with the housing main body as the cylindrical portion being fitted to the cylindrical bearing face. In this manner, the rotating body can be easily assembled to the housing.

A return spring to return the rotating body toward a predetermined angle position may be arranged at the housing and that the return spring is a torsion spring which exerts urging force around the axis line while exerting urging force in the direction of the axis line as being arranged around the cylindrical portion and between the disk portion and the housing cover.

With this configuration, the torsion spring being the return spring is fitted around the cylindrical portion of the rotating body as being contacted to the disk portion of the rotating body after the rotating body is assembled to the housing main body, and then, the housing cover is coupled with the housing main body from the above. In this manner, the rotating body and the return spring (i.e., the torsion spring) can be easily assembled to the housing and rattling of the rotating body in the thrust direction can be surely prevented.

The housing cover may be formed to be coupled with the housing main body by snap-fitting.

With this configuration, the housing cover can be coupled with the housing main body by simple structure, so that structural simplification, parts count reduction and the like can be achieved.

The movable sensor element of the sensor unit may include a disk-shaped magnet, the magnet being embedded at a center area where the axis line of the rotating body passes, the fixed sensor element of the sensor unit including a magnetic detection element capable of detecting variation of magnetic flux density while passing magnetic field lines generated from the magnet therethrough, and the magnetic detection element being arranged at a center area where the axis line of the housing passes.

With this configuration, a non-contact type magnetic sensor including the magnet and the magnetic detection element can be utilized as the sensor unit and the sensor unit is arranged at the center area where the axis line of the rotating body passes (that is, component arrangement can be performed as having the axis line as the center). Accordingly, structural simplification, miniaturization and the like can be achieved.

The fixed sensor element may be arranged at a circuit board which is detachably attachable to the housing.

With this configuration, the fixed sensor element (i.e., the magnetic detection element and the like) of the sensor unit can be fixed to the housing only by fitting the circuit board to the housing (i.e., the housing main body) and the assembling can be easily performed as a whole.

With the rotational position sensor having the above configuration, a rotating body such as a rotor and a shaft of which rotational position is to be detected can be supported so as to obtain an automatic alignment effect even with occurrence of aging variation such as wearing at a bearing area. Therefore, the rotational angle position of the rotating body can be detected with high accuracy. In addition, structural simplification, miniaturization and the like can be achieved by effectively utilizing an area on an axis line (i.e., a rotational center line) of the rotating body as a location for component arrangement.

BRIEF DESCRIPTION OF THE DRAWINGS

These and/or other aspects will become apparent and more readily appreciated from the following description of embodiments, taken in conjunction with the accompanying drawings of which.

DESCRIPTION OF EMBODIMENTS

Figure 1:
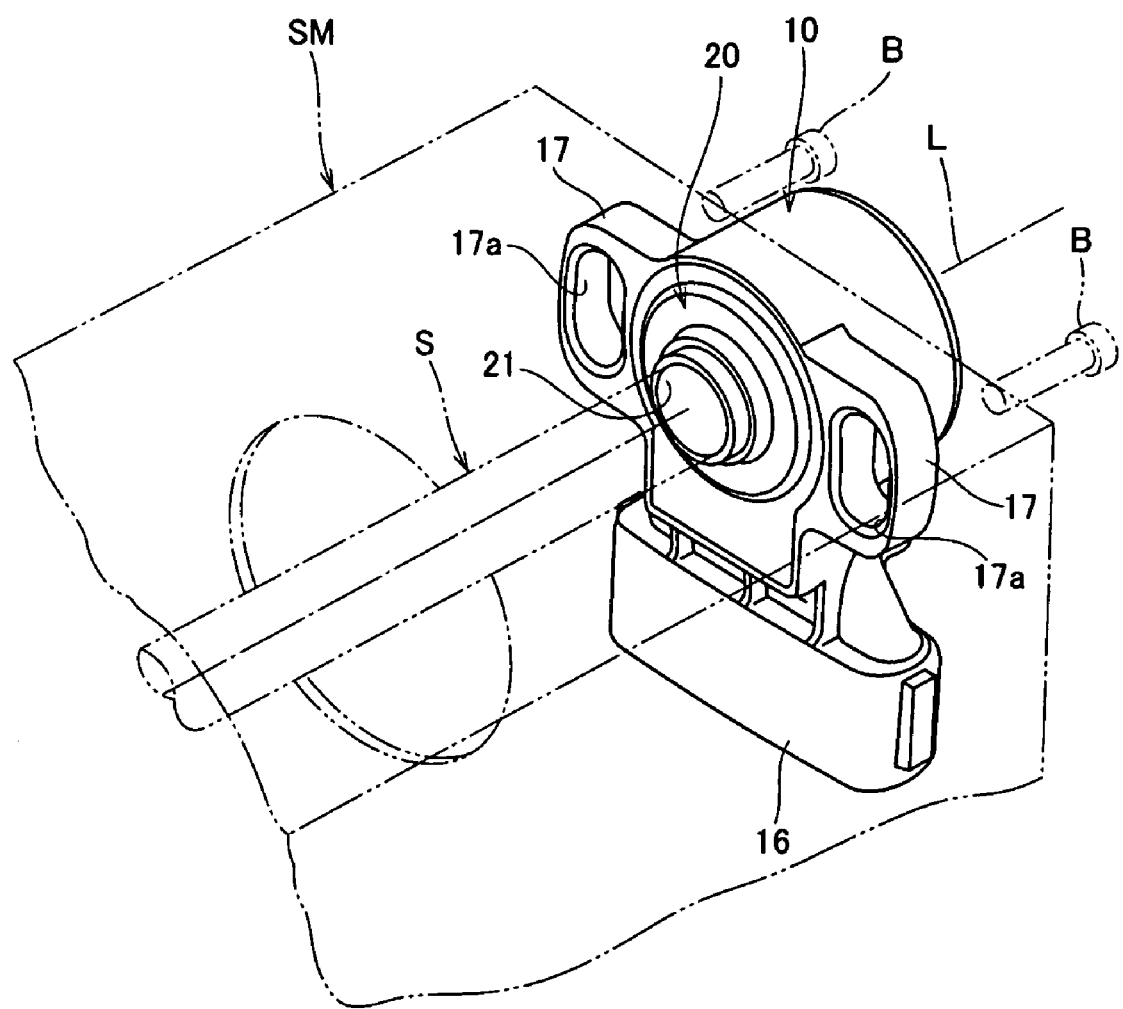
FIG. 1 is an external perspective view illustrating a rotational position senor of an embodiment.

Reference will now be made in detail to embodiments, examples of which are illustrated in the accompanying drawings, wherein like reference numerals refer to like elements throughout.

Figure 2:
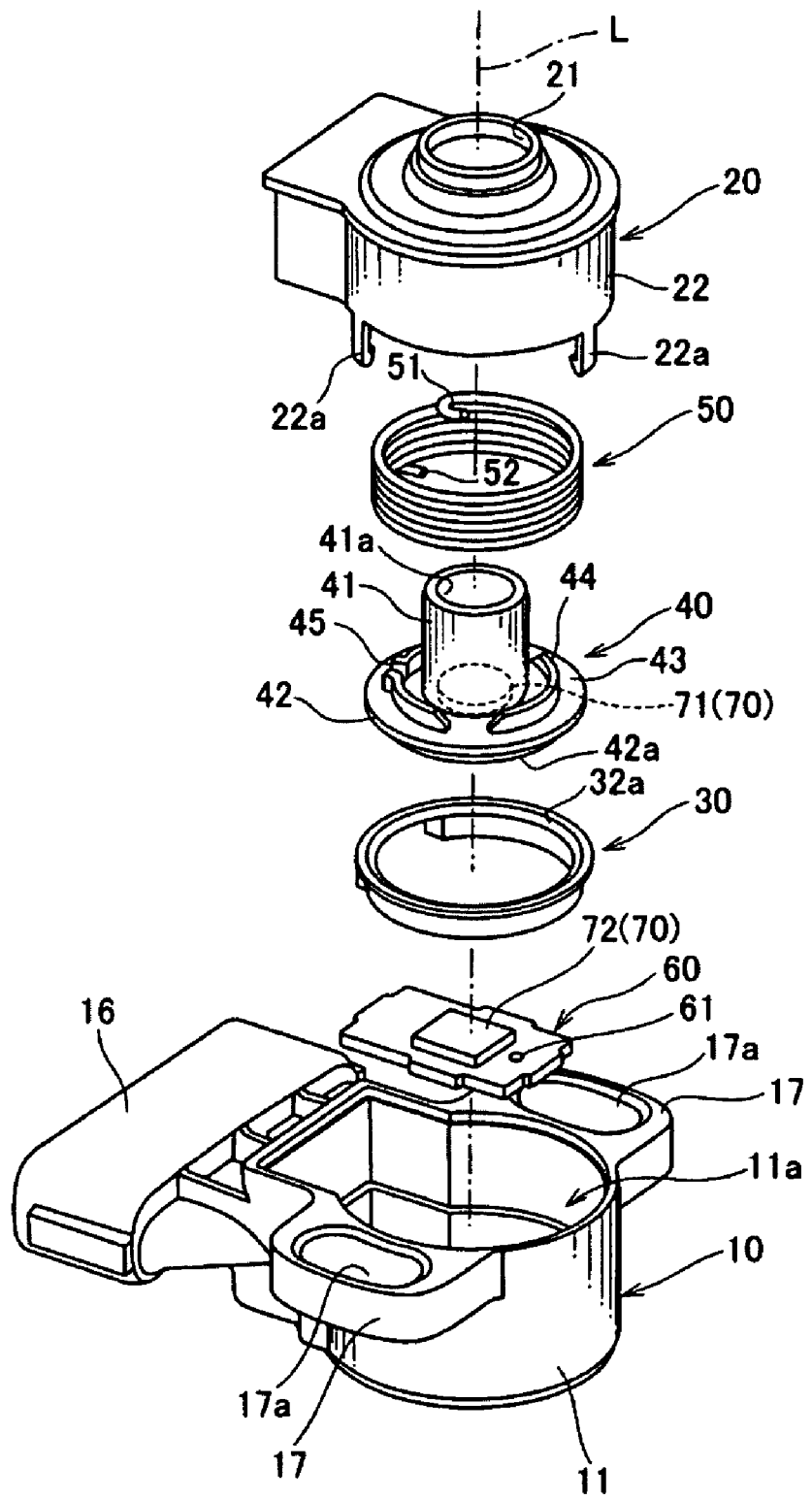
FIG. 2 is an exploded perspective view illustrating the rotational position sensor of the embodiment.
Figure 3:
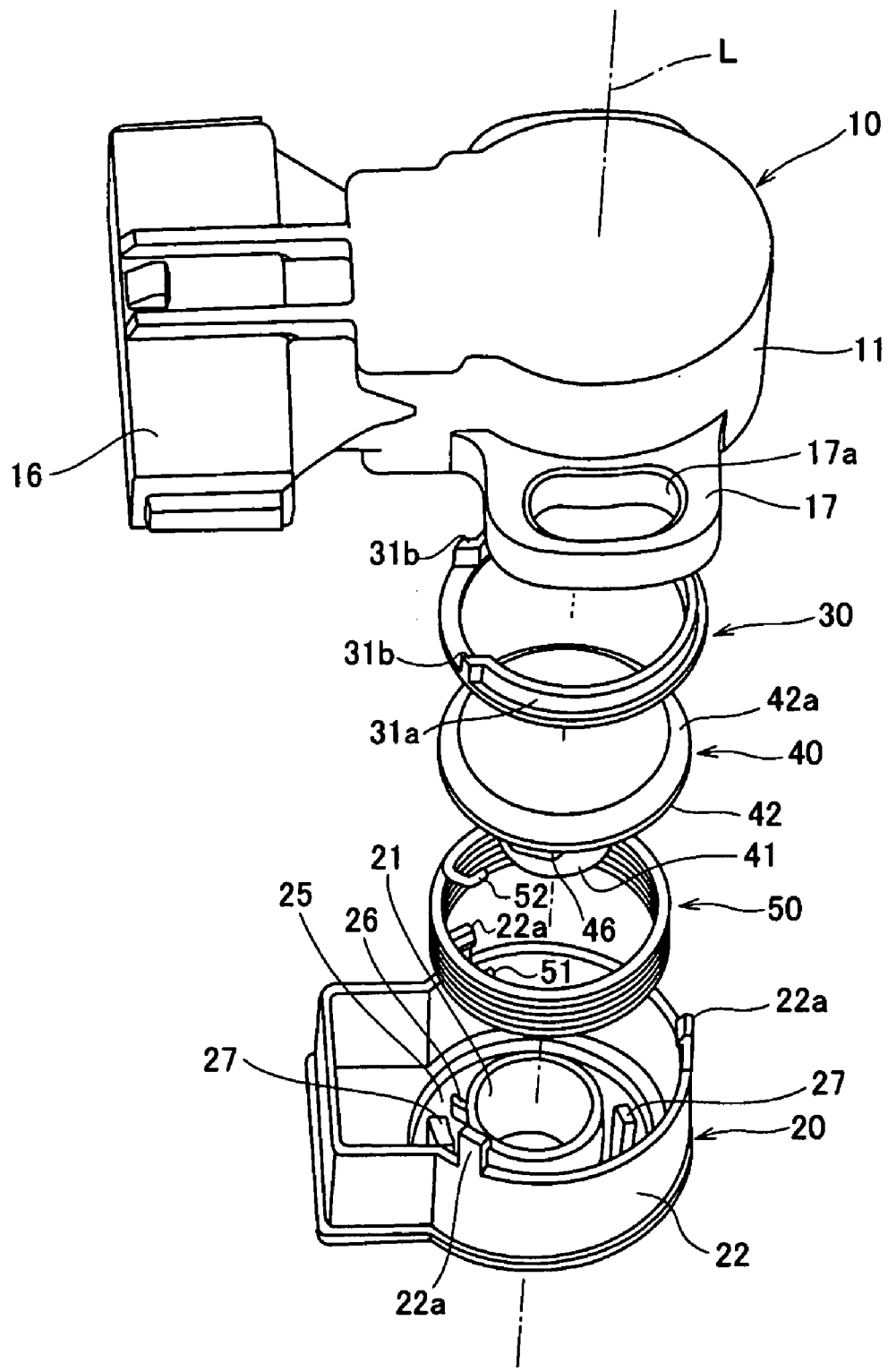
FIG. 3 is an exploded perspective view illustrating the rotational position sensor of the embodiment.
Figure 4:
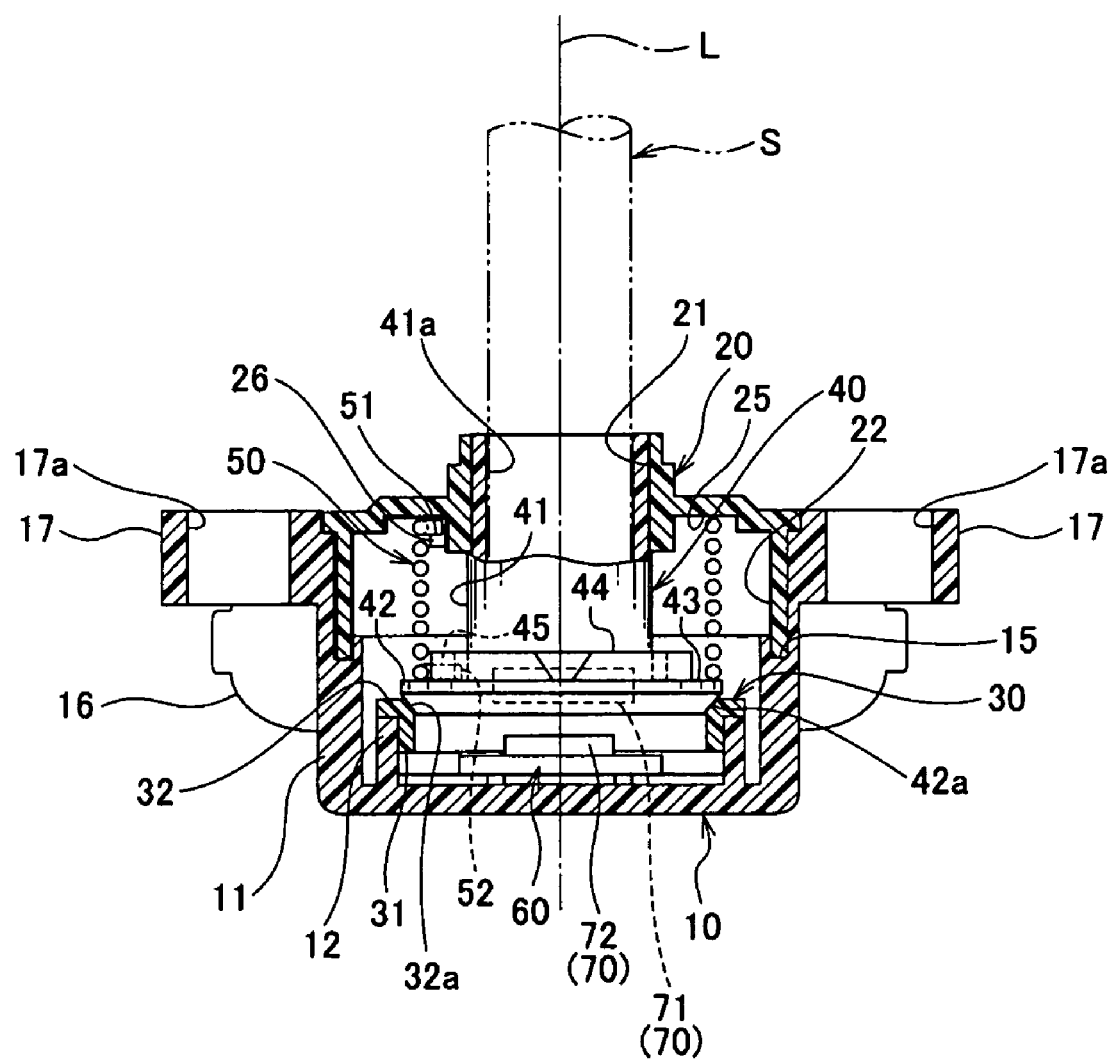
FIG. 4 is a sectional view illustrating the rotational position sensor of the embodiment.
Figure 5:
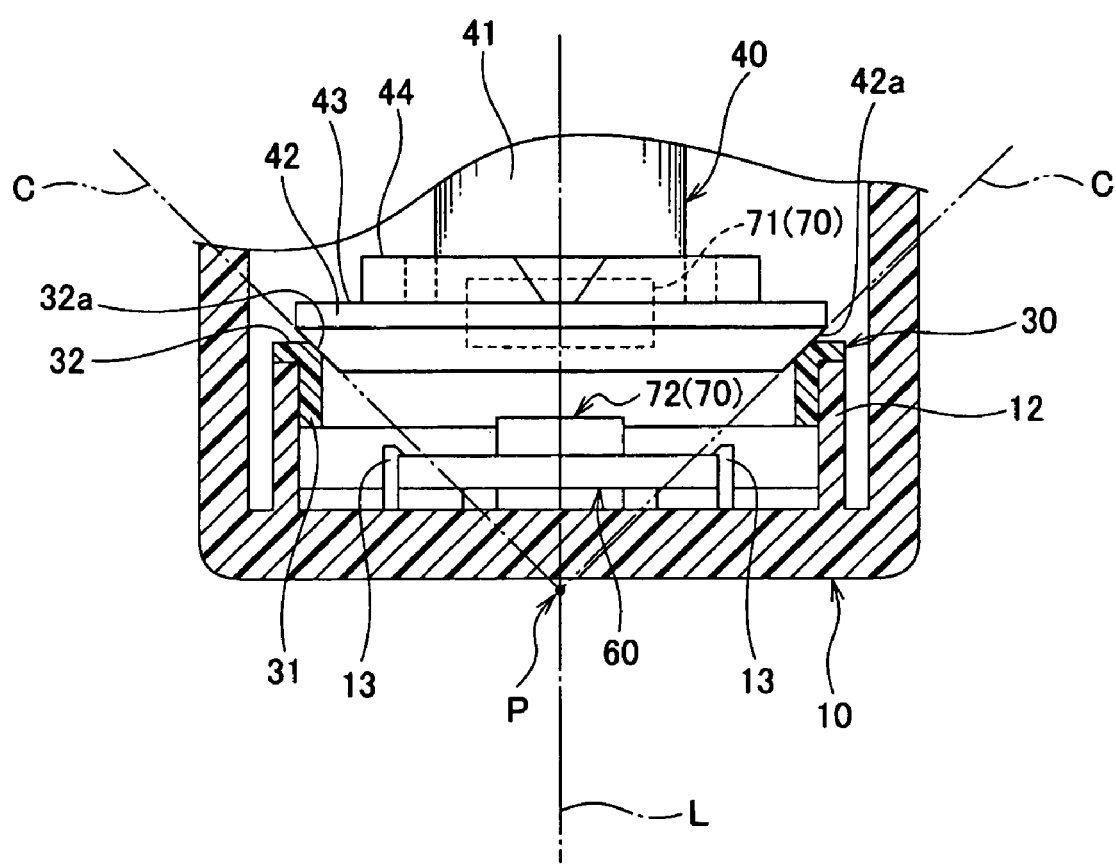
FIG. 5 is a partially sectioned view enlarging a part of the rotational position sensor illustrated in FIG. 4.
Figure 6A:
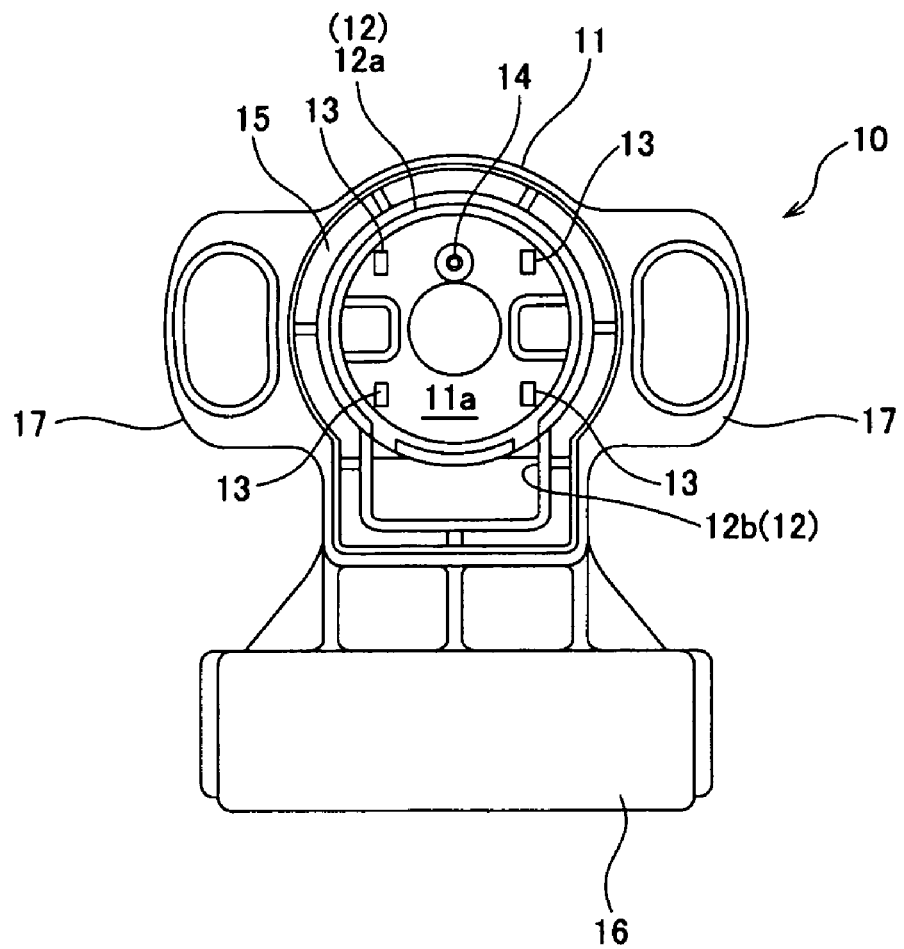
FIG. 6A is a plane view and FIG. 6B is a side view, both illustrating a housing main body which constitutes a part of the rotational position sensor according to the embodiment.
Figure 6B:
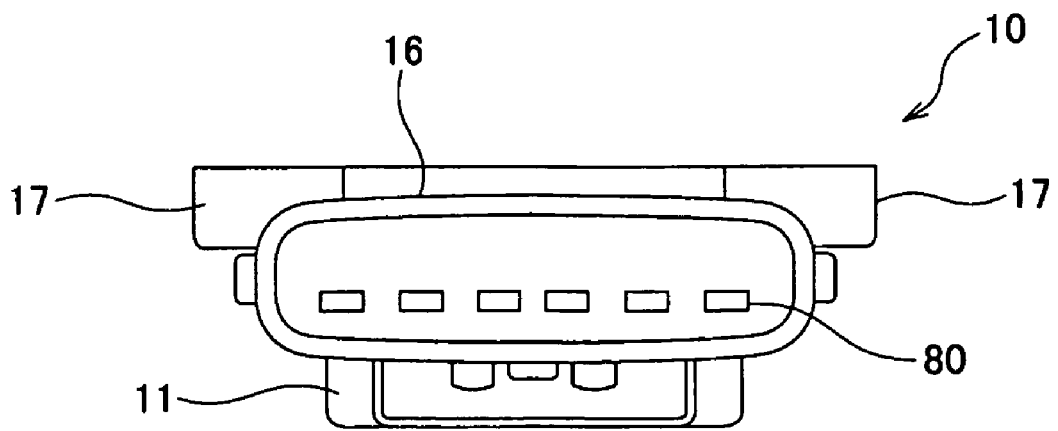
Figure 7:
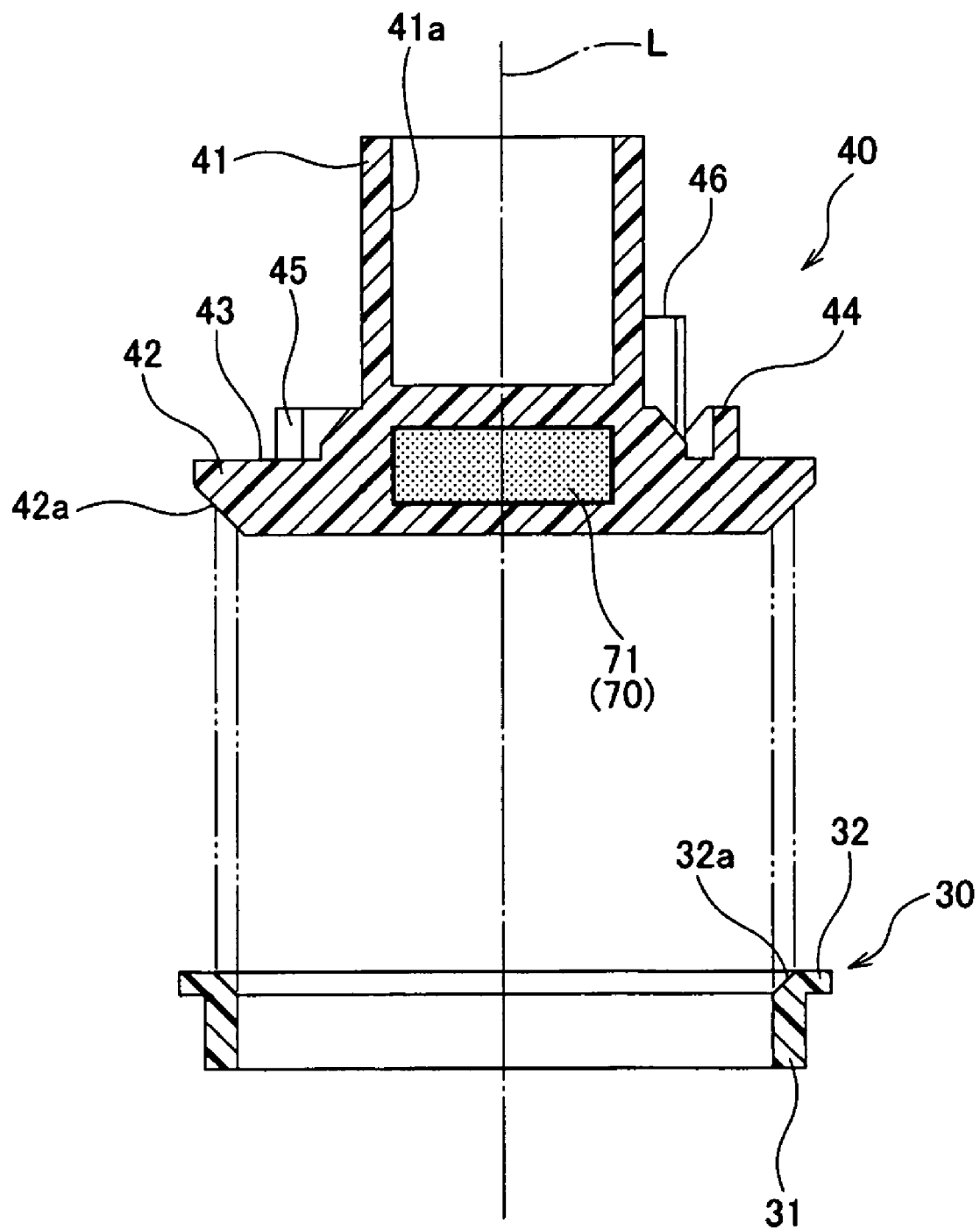
FIG. 7 is a sectional view illustrating a rotor (i.e., a rotating body) and a guide member which constitute a part of the rotational position sensor according to the embodiment.
Figure 8:
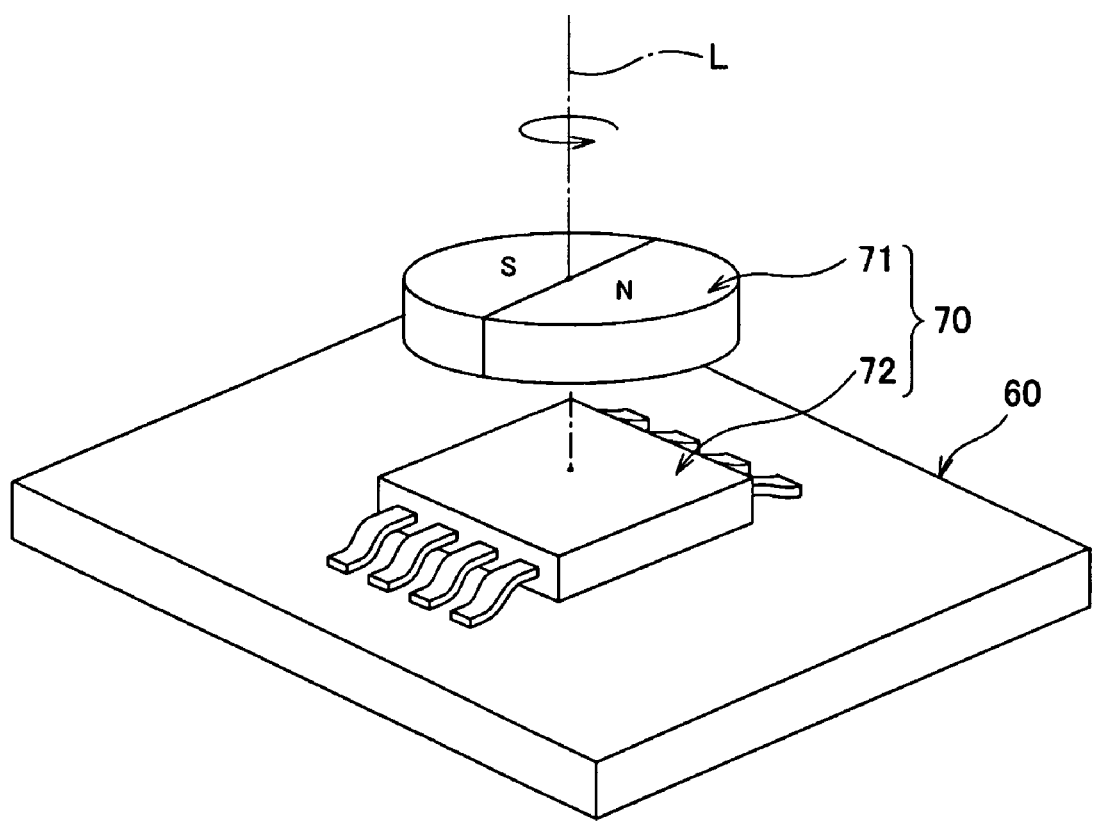
FIG. 8 is a schematic view illustrating a sensor unit which constitutes a part of the rotational position sensor according to the embodiment.

FIGS. 1-5, 6A, 6B, 7 and 8 are views illustrating an embodiment of a rotational position sensor. FIG. 1 is a perspective view illustrating an application example of the rotational position sensor. FIGS. 2 and 3 are exploded perspective views of the rotational position sensor. FIG. 4 is a sectional view of the rotational position sensor. FIG. 5 is a partially sectioned view of the rotational position sensor. FIG. 6A is a plane view and FIG. 6B is a side view, both illustrating a housing main body which constitutes a part of the rotational position sensor. FIG. 7 is a sectional view illustrating a rotating body and a guide member included in the rotational position sensor. FIG. 8 is a schematic view illustrating a sensor unit included in the rotational position sensor.

For example, the rotational position sensor is applied to detect a rotational angle position of a throttle shaft S as being attached to a throttle apparatus SM of an engine, as illustrated in FIG. 1.

That is, the rotational position sensor includes a housing main body 10 and a housing cover 20 as a housing, a guide member 30 fixed to the housing main body 10, a rotor 40 as a rotating body rotatably arranged within the housing, a return spring 50 to rotationally urge the rotor 40 toward a predetermined angle position, a circuit board 60 assembled to the housing main body 10, a sensor unit 70 including a movable sensor element arranged to the rotor 40 and a fixed sensor element arranged to the circuit board 60, a terminal 80 arranged to the housing main body 10, and the like, as illustrated in FIGS. 1 and 2.

The housing main body 10 includes a cylindrical portion 11 defining a cylindrical accommodating concave portion 11a having one end closed, a fit portion 12 which is formed to have the center on an axial line L coaxially at the inside of the cylinder portion 11 and to which a later-mentioned guide member 30 is fitted, four clip pieces 13 and one positioning protrusion 14 formed at the inside of the annular fit portion 12 to fix the circuit board 60, a fit groove 15 which couples the housing cover 20 by fitting, a connector portion 16 which accommodates the terminal 80 as extending from the cylindrical portion 11 in the radial direction, two attaching flange portions 17 extending from the cylindrical portion 11 in the radial direction, and the like, as illustrated in FIGS. 2-5, 6A and 6B.

The fit portion 12 has the later-mentioned guide member 30 fitted thereto so as to be integrally fixed to the housing main body 10. As illustrated in FIG. 6A, the fit portion 12 is formed to define an arc-shaped portion 12a and a parallel portion 12b extending from the arc-shaped portion 12a in the radial direction.

The clip portions 13 and the positioning protrusion 14 are formed to obtain snap-fit coupling so as to fix the circuit board 60 as nipping rim portions thereof with the four clip portions 13 while performing positional alignment with the positioning protrusion 14 when the circuit board 60 is to be arranged and fixed in the accommodating concave portion 11a.

The fit groove 15 is formed so that the later-mentioned housing cover 20 is integrally fixed to the housing main body 10 by snap-fit coupling as being fitted with a fit portion 22 (i.e., an engaging piece 22a thereof) of the later-mentioned housing cover 20.

The attaching flange portion 17 is formed to have oval-shaped bolt holes 17a and to be fastened and fixed to a side face of a throttle apparatus SM while adjusting the angle position by utilizing bolts B, as illustrated in FIG. 1.

The housing cover 20 is formed to be detachably attachable to the housing main body 10 with snap-fit coupling. As illustrated in FIGS. 1 to 4, the housing cover 20 includes a penetrating hole 21 through which a cylindrical portion 41 of the later-mentioned rotor 40 passes so that the rotor 40 is supported thereby, a fit portion 22 being fitted to the fit groove 15 of the housing main body 10, a spring receiving face 25 which receives one end side of the return spring 50 in the direction of the axial line L, an engaging protrusion 26 with which one end portion 51 of the return spring 50 is engaged, two stoppers 27 which restrict rotational angle range of the rotor 40, and the like.

The penetrating hole 21 is formed to smoothly rotate the cylindrical portion 41 of the rotor 40 and to have slight clearance against the outer circumferential face of the cylindrical portion 41 to prevent invasion of dust and the like.

The fit portion 22 is formed to obtain snap-fit coupling simultaneously when being fitted to the fit groove 15 of the housing main body 10 as having three engaging pieces 22a extending in the direction parallel to the axis line L, as illustrated in FIGS. 2 and 3.

The spring receiving face 25 is formed to receive one end side of the return spring 50 as being seated in a state that the return spring 50 is compressed by a predetermined amount in the direction of the axis line L in cooperation with a disk portion 42 of the later-mentioned rotor 40, as illustrated in FIG. 4.

The engaging protrusion 26 is formed to be engaged with the one end portion 51 of the return spring 50 so that urging force for returning to the initial position is generated when the return spring 50 is twisted around the axis line L.

The two stoppers 27 are formed to restrict the rotational angle range of the rotor 40 as extending from the spring receiving face 25 in the direction of the axis line L while a contact piece 46 of later-mentioned rotor 40 is contacted in the rotational direction around the axis line L, as illustrated in FIG. 3.

The guide member 30 includes a connection portion 31 which is to be fitted to the fit portion 12 of the housing main body 10 and an annular bearing portion 32 which defines an annular bearing face 32a as being integrally formed with the connection portion 31, as illustrated in FIGS. 3, 4, 5, and 7.

As illustrated in FIG. 3, the connection portion 31 is formed to define an arc-shaped portion 31a and two parallel portions 31b extending from the arc-shaped portion 31a in the radial direction. The connection portion 31 is to be fitted to the fit portion 12 so as to align the center thereof to the axis line L while restricting rotation of the guide member 30 around the axis line L.

The bearing portion 32 is annularly formed as extending from the connection portion 31 in the radial direction so as to be positioned in the axis line direction L as being contacted to an end face of the fit portion 12. The bearing portion 32 defines the annular bearing face 32a which rotatably supports the rotor 40 in the inner circumferential area.

As illustrated in FIG. 5, in order to rotatably support an annular contact face 42a of the later-mentioned rotor 40, the annular bearing face 32a is formed as a tapered annular face to define a part of a virtual cone face C having a vertex P on the axis line L, that is, to define an outer circumferential face of a truncated cone.

Then, the guide member 30 is to be fixed by being fitted to the fit portion 12 of the housing main body 10 after being formed separately from the housing main body 10.

In this manner, the guide member 30 fixed to the housing main body 10 after being formed separately is adopted and the annular bearing face 32a is formed at the guide member 30 as the bearing member to rotatably support the rotor 40. Accordingly, it is possible to adopt a dedicated material having excellent abrasion resistance that is different from the material of the housing (i.e., the housing main body 10). Therefore, total cost can be reduced while maintaining abrasion resistance and the like at the bearing area.

As illustrated in FIGS. 2 to 5 and 7, the rotor 40 includes the cylindrical portion 41 having the center thereof on the axis line L, the disk portion 42 which defines the annular contact face 42a as being integrally formed with the cylindrical portion 41 at one end side thereof, a spring receiving face 43 which receives the other end side of the return spring 50 as being formed at the upper face of the disk portion 42, an annular positioning portion 44 formed as annularly extending on the spring receiving face 43, an engaging groove 45 with which the other end portion 52 of the return spring 50 is engaged as being formed to cut out a part of the annular positioning portion 44, the contact piece 46 which contacts to the stopper 27 of the housing cover 20 in the rotational direction around the axis line L, and the like.

The cylindrical portion 41 defines a connection hole 41a at the inside thereof for connection so as to integrally rotate the shaft S of which rotational angle is detected as being arranged at the outside of the housing (i.e., the housing main body 10 and the housing cover 20).

The disk portion 42 defines the annular contact face 42a which is rotatably contacted to the annular bearing face 32a of the guide member 30, as illustrated in FIG. 5

The annular contact face 42a is formed as defining a part of the virtual cone face C having the vertex P on the axis line L, that is, as a tapered annular face defining the outer circumferential face of a truncated cone, as illustrated in FIG. 5.

The spring receiving face 43 is formed to receive the other end side of the return spring 50 as being seated in a state that the return spring 50 is compressed by a predetermined amount in the direction of the axis line L in cooperation with the spring receiving face 25 of the housing cover 20, as illustrated in FIG. 4.

The annular positioning portion 44 is formed to be arc-shaped having the center thereof coaxially on the axis line L around the cylindrical portion 41 so as to restrict movement of the return spring 50 in the radial direction on the disk portion 42 (i.e., the spring receiving face 43).

The engaging groove 45 is formed to be engaged with the other end portion 52 of the return spring 50 so as to generate urging force for returning to the initial position when the return spring 50 is twisted around the axial line L.

The contact piece 46 is formed so that further rotation is restricted as being contacted to one stopper 27 when located at the initial position due to rotational urging force of the return spring 50 and further rotation is restricted (i.e., the maximum rotational angle position is defined) as being contacted to the other stopper 27 when the rotor 40 (i.e., the shaft S) is rotated against the rotational urging force of the return spring 50.

Further, the rotor 40 includes a magnet 71 (as a movable sensor element) of the sensor unit 70 embedded at the center area thereof where the axis line L passes.

In a state that the rotor 40 is accommodated by the housing (i.e., the housing main body 10 and the housing cover 20), the annular contact face 42a of the disk portion 42 is rotatably supported by the annular bearing face 32a of the guide member 30 fixed to the housing main body 10 and the cylindrical portion 41 is rotatably supported by the penetrating hole 21 of the housing cover 20.

Accordingly, at the time of assembling, the rotor 40 is assembled to the housing main body 10 as the annular contact face 42a being contacted to the annular bearing face 32a, and then, the housing cover 20 is coupled with the housing main body 10 by snap-fitting while the cylindrical portion 41 is fitted to the penetrating hole 21. In this manner, the rotor 40 can be easily assembled to the housing.

Further, since the rotor 40 has the connection hole 41a to connect the shaft S of which rotational angle is to be detected as being arranged outside the housing, it is essentially possible to detect the angle position only by connecting the shaft S of which rotational angle position is to be detected to the connection hole 41a.

Accordingly, the rotational position sensor can be handled as an independent module component with high flexibility. Therefore, the rotational position sensor can be adopted to any object which includes a shaft S to be detected.

The return spring 50 is a torsion spring exerting rotational urging force around the axis line L while being assembled in a state of being compressed by a predetermined amount in the direction of the axis line L, as illustrated in FIGS. 2 to 4. One end side of the return spring 50 is seated on the spring receiving face 25 of the housing cover 20 around the cylindrical portion 41 of the rotor 40 while one end portion 51 is engaged with the engaging protrusion 26 of the housing cover 20. Then, the other end side of the return spring 50 is seated on the spring receiving face 43 around the annular positioning portion 44 of the rotor 40 while the other end portion 52 is engaged with the engaging groove 45 of the rotor 40.

That is, the return spring 50 is fitted around the cylindrical portion 41 of the rotor 40 as being contacted to the spring receiving face 43 (of the disk portion 42) of the rotor 40 and having the other end portion 52 engaged with the engaging groove 45 after the rotor 40 is assembled to the housing main body 10, and then, the housing cover 20 is coupled with the housing main body 10 from above by snap-fitting while the one end portion 51 is engaged with the engaging protrusion 26. In this manner, the rotor 40 and the return spring 50 can be easily assembled to the housing.

Accordingly, the return spring 50 exerts urging force to prevent rattling of the rotor 40 in the direction of the axis line L (i.e., the thrust direction) while exerting rotational urging force to return the rotor 40 toward the predetermined angle position (i.e., the initial position).

As illustrated in FIGS. 1, 2 and 5, the circuit board 60 is formed approximately rectangular and includes a positioning hole 61 at a part thereof, a magnetic detection element 72 as a later-mentioned fixed sensor element mounted on the upper face thereof and other mounted electronic parts (not illustrated).

Then, the circuit board 60 is fixed as being positioned at a predetermined position in the accommodating concave portion 11*a* while the rim portion thereof is nipped by the four clip portions 13 of the housing main body 10.

As illustrated in FIGS. 4, 5 and 8, the sensor unit 70 is constituted with the magnet 71 as the movable sensor element embedded at the rotor 40, the magnetic detection element 72 as the fixed sensor element mounted on the circuit board 60, and the like.

The magnet 71 is embedded at the center area where the axis line L of the rotor 40 passes, as illustrated in FIG. 7. Further, the magnet 71 is formed to be disk-shaped having predetermined thickness and magnetized as approximate half part being the north pole and the remaining approximate half part being the south pole, as illustrated in FIG. 8.

As illustrated in FIGS. 2, 5 and 8, the magnetic detection element 72 is arranged via the circuit board 60 at the center area of the housing main body 10 where the axis line L passes. The resistance value thereof varies in accordance with angle variation (i.e., the magnetic field variation) relatively against the magnet 71. That is, the magnetic detection element 72 detects the angle position of the rotor 40 by detecting variation of the incident angle of magnetic fluxes.

Regarding the relative positional relation between the magnet 71 and the magnetic detection element 72 in the sensor unit 70, an allowable range exists to some extent (i.e., being insensitive) against displacement in the direction of the axis line L. However, displacement in the direction perpendicular to the axis line L (i.e., center deviation) needs to be controlled with high accuracy (i.e., being sensitive).

Accordingly, the magnet 71 embedded at the rotor 40 and the magnetic detection element 72 on the circuit board 60 fixed to the housing main body 10 are required to be positioned with high accuracy (i.e., coaxial centering) on the face perpendicular to the axis line L.

Here, the annular contact face 42*a* of the rotor 40 is rotatably supported around the axis line L as being contacted to the annular bearing face 32*a* included in the housing main body 10. Further, the annular contact face 42*a* and the annular bearing face 32*a* are located on the virtual cone face C having the vertex P on the axis line L. Accordingly, the rotor 40 is to be consistently located on the axis line L due to an automatic alignment effect. Therefore, even with occurrence of aging variation such as wearing at the bearing area, positional deviation of the magnet 71 (i.e., the movable sensor element) of the rotor 40 and the magnetic detection element 72 (i.e., the fixed sensor element) of the housing main body 10, which constitute the sensor unit 70, against the axis line L can be prevented and the rotational angle position of the rotor 40 can be detected with high accuracy.

Further, the movable sensor element (i.e. the magnet 71) and the fixed sensor element (i.e., the magnetic detection element 72) of the sensor unit 70 are arranged at the center area where the axis line L of the rotor 40 passes, that is, component arrangement can be performed as having the axis line L as the center. Accordingly, structural simplification, miniaturization and the like can be achieved.

Further, the fixed sensor element (i.e., the magnetic detection element 72) of the sensor unit 70 is arranged to the circuit board 60 which is detachably attachable to the housing main body 10. Accordingly, the fixed sensor element (i.e., the magnetic detection element 72) of the sensor unit 70 can be fixed to the housing only by fitting the circuit board 60 to the housing (i.e., the housing main body 10), so that the assembling can be easily performed as a whole.

In the above description, the non-contact type sensor is constituted with the magnet 71 and the magnetic detection element 72 as the sensor unit 70. However, the embodiments are not limited to this and it is also possible to adopt a non-contact type sensor utilizing a magnetic resistance element (MR) as the magnetic detection element 72. Further, it is also possible to adopt a contact type sensor and the like to detect the rotational angle corresponding to variation of a resistance value including a movable contact point as the movable sensor element and a wiring terminal as the fixed sensor element.

Figure 9:
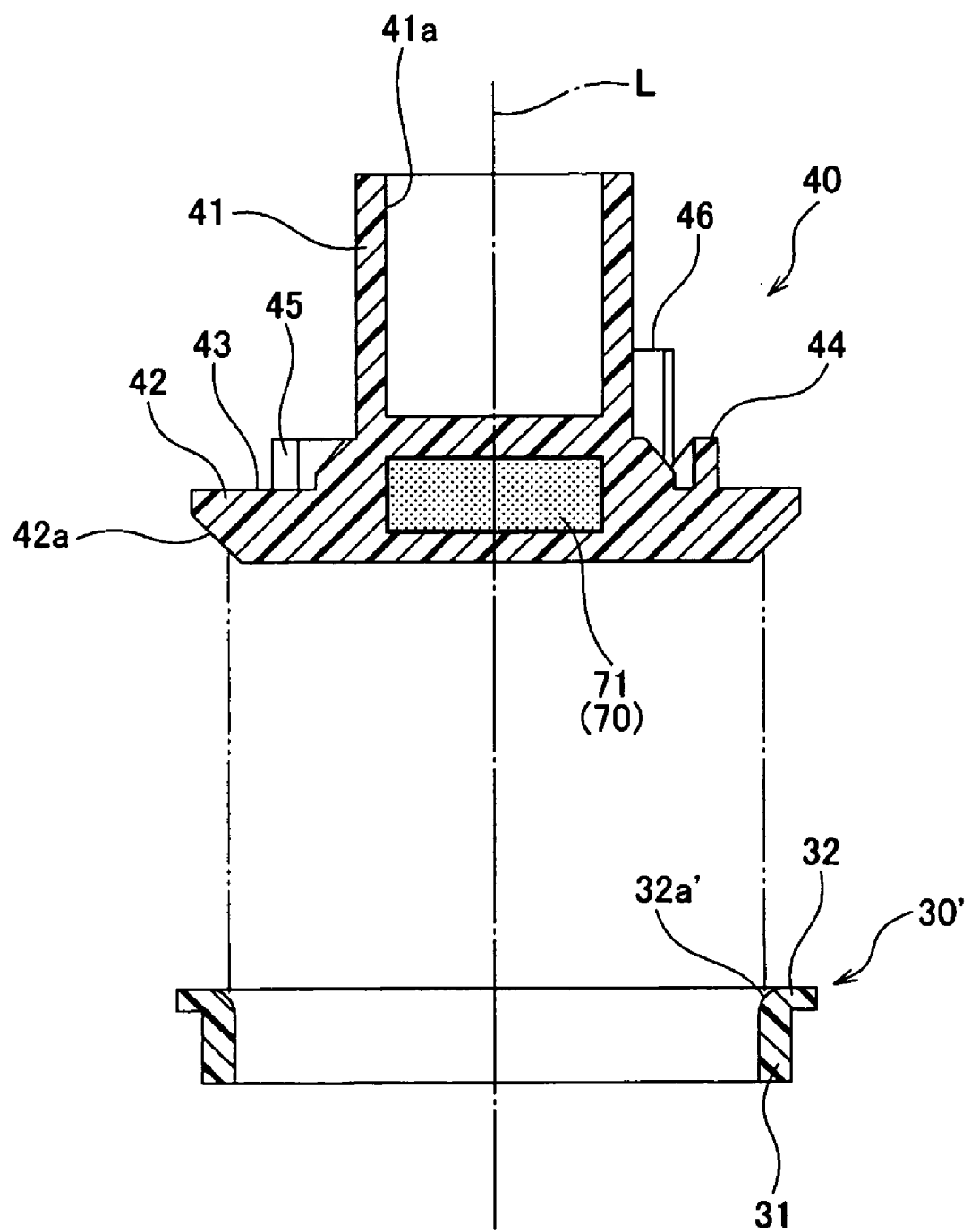
FIG. 9 is a sectional view illustrating a rotor (i.e., a rotating body) and a guide member which constitute a part of a rotational position sensor of another embodiment.

FIG. 9 is a sectional view illustrating another embodiment of a rotational position sensor according to the present invention. Here, the annular bearing face 32*a* of the guide member 30 of the above embodiment illustrated in FIG. 7 is changed in shape. In the following, the same numeral is given to the same structure of the above embodiment and the description thereof is not repeated.

In the embodiment, a guide member 30' includes the connection portion 31 fitted to the fit portion 12 of the housing main body 10 and an annular bearing portion 32 defining an annular bearing face 32*a*' as being integrally formed with the connection portion 31, as illustrated in FIG. 9.

The annular bearing face 32*a*' is formed to have a section curved as being convex toward the annular contact face 42*a*, as illustrated in FIG. 9.

In the embodiment, being similar to the above, the rotor 40 is rotatably supported around the axis line L as the annular contact face 42*a* being contacted to the annular bearing face 32*a*' included in the housing main body 10. Further, the annular contact face 42*a* and the annular bearing face 32*a*' are located on the virtual cone face C having the vertex P on the axis line L. Accordingly, the rotor 40 is to be consistently located on the axis line L due to the automatic alignment effect. Therefore, even with occurrence of aging variation such as wearing at the bearing area, positional deviation of the movable sensor element (i.e., the magnet 71) of the rotor 40 and the fixed sensor element (i.e., the magnetic detection element 72) of the housing, which constitute the sensor unit 70, against the axis line L can be prevented and the rotational angle position of the rotor 40 can be detected with high accuracy.

Specifically, the annular bearing face 32*a*' is formed so that the section thereof is curved as being convex-shaped. Accordingly, the rotor 40 can be rotated more smoothly by decreasing slide resistance between the annular contact face 42*a* and the annular bearing face 32*a*' while maintaining the automatic alignment effect of the rotor 40.

Figure 10:
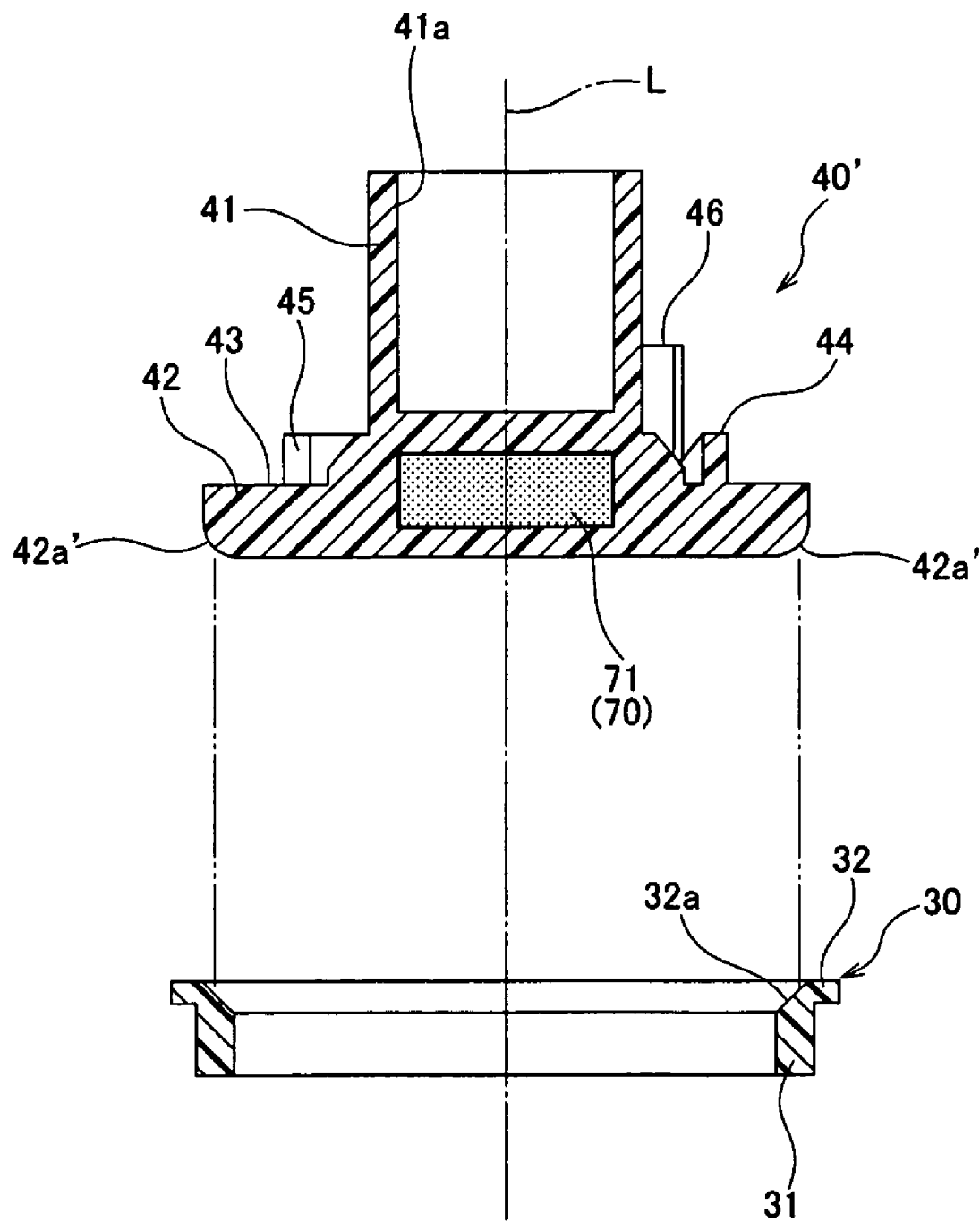
FIG. 10 is a sectional view illustrating a rotor (i.e., a rotating body) and a guide member which constitute a part of a rotational position sensor of another embodiment.

Further, FIG. 10 is a sectional view illustrating another embodiment of a rotational position sensor according to the present invention. Here, the annular contact face 42*a* of the disk portion 42 of the rotor 40 of the above embodiment illustrated in FIG. 7 is changed in shape. In the following, the same numeral is given to the same structure of the above embodiment and the description thereof is not repeated.

In the embodiment, a rotor 40' includes the cylindrical portion 41, the disk portion 42, the spring receiving portion 43, the annular positioning portion 44, the engaging groove 45, the contact piece 46, and the like, as illustrated in FIG. 10.

The annular contact face 42*a*' is formed to have a section curved as being convex toward the annular bearing face 32*a* of the guide member 30, as illustrated in FIG. 10.

In the embodiment, being similar to the above, the rotor 40' is rotatably supported around the axis line L as the annular contact face 42*a*' being contacted to the annular bearing face 32*a* included in the housing main body 10. Further, the annular contact face 42*a*' and the annular bearing face 32*a* are located on the virtual cone face C having the vertex P on the axis line L. Accordingly, the rotor 40' is to be consistently located on the axis line L due to the automatic alignment effect. Therefore, even with occurrence of aging variation such as wearing at the bearing area, positional deviation of the movable sensor element (i.e., the magnet 71) of the rotor 40' and the fixed sensor element (i.e., the magnetic detection element 72) of the housing, which constitute the sensor unit 70, against the axis line L can be prevented and the rotational angle position of the rotor 40' can be detected with high accuracy.

Specifically, the annular contact face 42a' is formed so that the section thereof is curved as being convex-shaped. Accordingly, the rotor 40' can be smoothly rotated by decreasing slide resistance between the annular contact face 42a' and the annular bearing face 32a while maintaining the automatic alignment effect of the rotor 40'.

Figure 11:
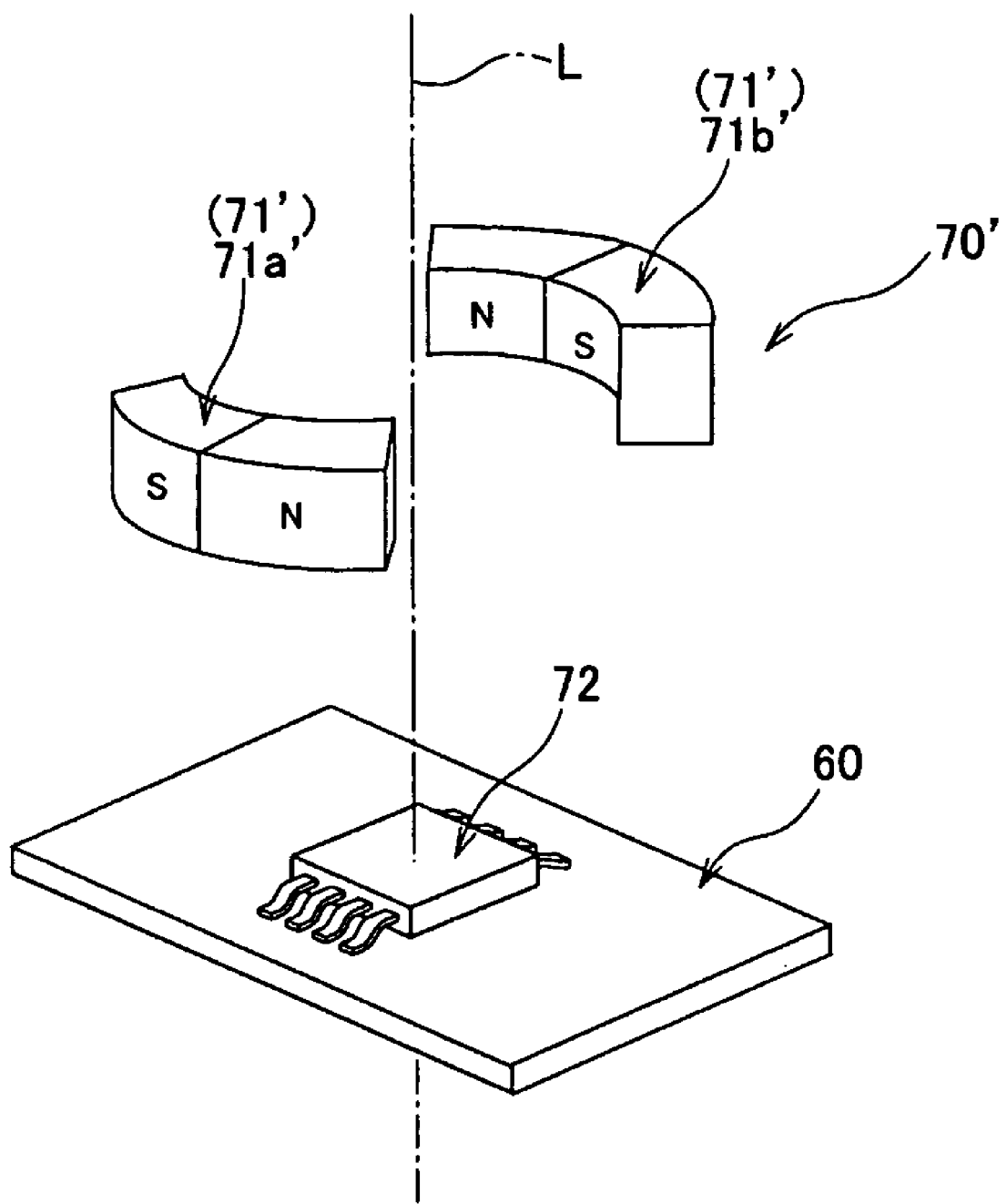
FIG. 11 is a schematic view illustrating a sensor unit which constitutes a part of a rotational position sensor of another embodiment.

Further, FIG. 11 is a view illustrating another embodiment of a rotational position sensor according to the present invention. Here, the magnet 71 of the sensor unit 70 of the above embodiment illustrated in FIG. 8 is changed in shape. In the following, the same numeral is given to the same structure of the above embodiment and the description thereof is not repeated.

In the embodiment, a sensor unit 70' is constituted with a magnet 71' as the movable sensor element embedded at the rotor 40, the magnetic detection element 72 as the fixed sensor element mounted on the circuit board 60, and the like, as illustrated in FIG. 11.

The magnet 71' is embedded at the center area where the axis line L of the rotor 40 passes as being divided into two magnets 71a', 71b', as illustrated in FIG. 11. The magnets 71a', 71b' are formed to be arc-shaped having predetermined thickness and magnetized respectively as approximate half part being the north pole and the remaining approximate half part being the south pole in the circumferential direction, as illustrated in FIG. 11.

Further, the movable sensor element (i.e. the magnet 71') and the fixed sensor element (i.e., the magnetic detection element 72) of the sensor unit 70' are arranged at the center area where the axis line L of the rotor 40 passes, that is, component arrangement can be performed as having the axis line L as the center. Accordingly, structural simplification, miniaturization and the like can be achieved.

Further, the fixed sensor element (i.e., the magnetic detection element 72) of the sensor unit 70' is arranged to the circuit board 60 which is detachably attachable to the housing main body 10. Accordingly, the fixed sensor element (i.e., the magnetic detection element 72) of the sensor unit 70' can be fixed to the housing only by fitting the circuit board 60 to the housing (i.e., the housing main body 10), so that the assembling can be easily performed as a whole.

Figure 12:
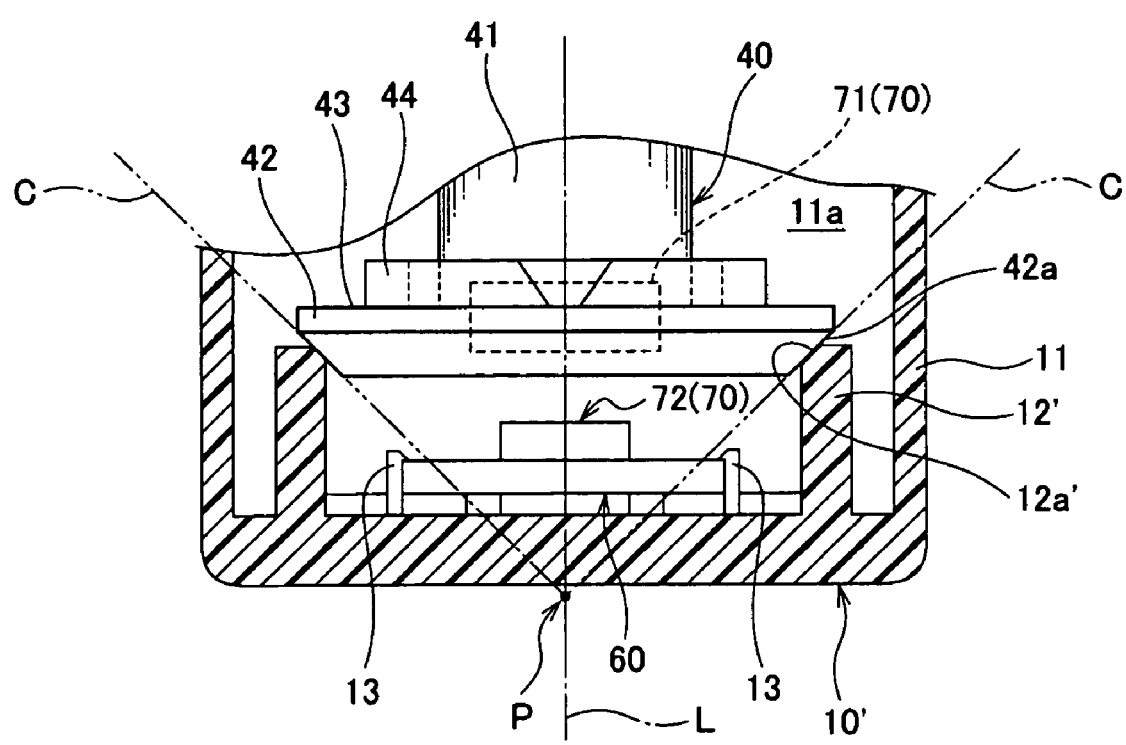
FIG. 12 is a partially sectioned view enlarging a part of a rotational position sensor of another embodiment.

Furthermore, FIG. 12 is a view illustrating another embodiment of a rotational position sensor according to the present embodiment. Compared to the above embodiments, the guide member 30, 30' is eliminated and a bearing portion 12' is integrally formed with a housing main body 10'. In the following, the same numeral is given to the same structure of the above embodiment and the description thereof is not repeated.

That is, in the embodiment, the housing main body 10' includes the annular bearing portion 12' which defines an annular bearing face 12a' integrally formed as extending in the accommodating concave portion 11a'.

As illustrated in FIG. 12, the annular bearing face 12a' is formed as a tapered annular face to define a part of the virtual cone face C having the vertex P on the axis line L, that is, to define an outer circumferential face of a truncated cone, so as to rotatably support an annular contact face 42a of the rotor 40.

In the embodiment, being similar to the above, the rotor 40 is rotatably supported around the axis line L as the annular contact face 42a being contacted to the annular bearing face 12a' included in the housing main body 10'. Further, the annular contact face 42a and the annular bearing face 12a' are located on the virtual cone face C having the vertex P on the axis line L. Accordingly, the rotor 40 is to be consistently located on the axis line L due to the automatic alignment effect. Therefore, even with occurrence of aging variation such as wearing at the bearing area, positional deviation of the movable sensor element (i.e., the magnet 71) of the rotor 40 and the fixed sensor element (i.e., the magnetic detection element 72) of the housing, which constitute the sensor unit 70, against the axis line L can be prevented and the rotational angle position of the rotor 40 can be detected with high accuracy.

Specifically, since the bearing member 12' is integrally formed with the housing main body 10', parts count of the housing main body 10' can be reduced and the structure can be simplified.

In the description of the above embodiment, the rotor 40 accommodated by the housing (i.e., the housing main body 10 and the housing cover 20) is adopted as the rotating body. However, the embodiments are not limited to this and it is also possible to adopt a shaft S directly inserted to the inside of the housing from the outside.

In the description of the above embodiment, the throttle apparatus SM is adopted as an object to which the rotational position sensor is applied. However, not limited to this, it is also possible to be applied to an accelerator pedal apparatus to detect a depression amount of an accelerator pedal or to other apparatuses requiring rotational angle detection.

In the description of the above embodiment, the housing is divided into two to be the housing main body 10 and the housing cover 20. However, the embodiments are not limited to this and an integrated housing may be adopted as long as the rotor 40, the return spring 50 and the like can be assembled.

In the description of the above embodiment, a torsion spring is adopted as the return spring 50. However, the embodiments are not limited to this and another spring may be adopted as long as the effect that the rotor 40 is urged in the direction of the axis line L while being rotationally urged around the axis line L is performed.

In the above description, the return spring 50 is adopted in the above embodiment. However, the embodiments are not limited to this and a structure may be adopted having a return spring 50 at an external object side to eliminate the return spring 50 from the rotational position sensor.

Industrial Applicability

As described above, with the rotational position sensor of the embodiments, a rotating body such as a rotor and a shaft of which rotational position is to be detected can be supported so as to obtain automatic alignment effect even with occurrence of aging variation such as wearing at a bearing area. Further, structural simplification, miniaturization and the like can be achieved. Accordingly, in addition to engine-related apparatuses, the embodiments are useful for apparatuses related to other machines or for apparatuses related to electrics as long as the object requires detection of a rotational angle position of a rotating body with high accuracy.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A rotational position sensor to detect the rotational angle of a shaft, comprising:
   a housing including a bearing portion;
   a rotating body rotatably supported by the bearing portion around a predetermined axis line; and
   a sensor unit including a movable sensor element arranged at the rotating body to detect a rotational angle position of the rotating body and a fixed sensor element arranged at the housing, the movable sensor element and the fixed sensor element being arranged at a center area centered on the axis line,
   wherein the rotating body includes an annular contact face having the axis line as the center,
   the bearing portion includes an annular bearing face having the axis line as the center and receiving the annular contact face,
   at least one of the annular contact face and the annular bearing face is formed to be a tapered annular face which defines a part of a virtual cone face having a vertex on the axis line, and
   the annular contact face and the annular bearing face are outside the center area in which the movable sensor element and the fixed sensor element are arranged.

2. The rotational position sensor according to claim 1, wherein the housing includes a guide member which is formed separately, and
   the guide member includes the annular bearing face.

3. The rotational position sensor according to claim 2, wherein the annular bearing face includes a section curved convexly toward the annular contact face.

4. The rotational position sensor according to claim 3, wherein the rotating body includes a connection hole to connect the shaft.

5. The rotational position sensor according to claim 2, wherein the rotating body includes a connection hole to connect the shaft.

6. The rotational position sensor according to claim 2, further comprising a return spring to return the rotating body toward a predetermined angle position, the return spring being arranged at the housing.

7. The rotational position sensor according to claim 2, wherein the rotating body includes a cylindrical portion having the axis line as the center and a disk portion which defines the annular contact face as being formed integrally with one end side of the cylindrical portion, and
   the housing includes a housing main body having the annular bearing face and a housing cover having a cylindrical bearing face to rotatably support the cylindrical portion as being formed detachably attachable to the housing main body.

8. The rotational position sensor according to claim 1, wherein the annular bearing face includes a section curved convexly toward the annular contact face.

9. The rotational position sensor according to claim 8, wherein the rotating body includes a connection hole to connect the shaft.

10. The rotational position sensor according to claim 8, further comprising a return spring to return the rotating body toward a predetermined angle position, the return spring being arranged at the housing.

11. The rotational position sensor according to claim 8, wherein the rotating body includes a cylindrical portion having the axis line as the center and a disk portion which defines the annular contact face as being formed integrally with one end side of the cylindrical portion, and
   the housing includes a housing main body having the annular bearing face and a housing cover having a cylindrical bearing face to rotatably support the cylindrical portion as being formed detachably attachable to the housing main body.

12. The rotational position sensor according to claim 1, wherein the rotating body includes a connection hole to connect the shaft.

13. The rotational position sensor according to claim 12, further comprising a return spring to return the rotating body toward a predetermined angle position, the return spring being arranged at the housing.

14. The rotational position sensor according to claim 12, wherein the rotating body includes a cylindrical portion having the axis line as the center and a disk portion which defines the annular contact face as being formed integrally with one end side of the cylindrical portion, and
   the housing includes a housing main body having the annular bearing face and a housing cover having a cylindrical bearing face to rotatably support the cylindrical portion as being formed detachably attachable to the housing main body.

15. The rotational position sensor according to claim 1, further comprising a return spring to return the rotating body toward a predetermined angle position, the return spring being arranged at the housing.

16. The rotational position sensor according to claim 1, wherein the rotating body includes a cylindrical portion having the axis line as the center and a disk portion which defines the annular contact face as being formed integrally with one end side of the cylindrical portion, and
   the housing includes a housing main body having the annular bearing face and a housing cover having a cylindrical bearing face to rotatably support the cylindrical portion as being formed detachably attachable to the housing main body.

17. The rotational position sensor according to claim 16, further comprising a return spring to return the rotating body toward a predetermined angle position, the return spring being arranged at the housing, and the return spring being a torsion spring which exerts urging force around the axis line while exerting urging force in the direction of the axis line as being arranged around the cylindrical portion and between the disk portion and the housing cover.

18. The rotational position sensor according to claim 16, wherein the housing cover is formed to be coupled with the housing main body by snap-fitting.

19. The rotational position sensor according to claim 1, wherein the movable sensor element of the sensor unit includes a disk-shaped magnet,
   the magnet is embedded at the center area where the axis line of the rotating body passes,
   the fixed sensor element of the sensor unit includes a magnetic detection element capable of detecting variation of magnetic flux density while passing magnetic field lines generated from the magnet therethrough, and
   the magnetic detection element is arranged at the center area where the axis line of the housing passes.

20. The rotational position sensor according to claim 1, wherein the fixed sensor element is arranged at a circuit board which is detachably attachable to the housing.

* * * * *